US008048947B2

(12) United States Patent
Gong et al.

(10) Patent No.: US 8,048,947 B2
(45) Date of Patent: Nov. 1, 2011

(54) NANOCOMPOSITES AND METHODS FOR MAKING THE SAME

(75) Inventors: Caiguo Gong, Pearland, TX (US); Carmen Neagu, Friendswood, TX (US); Beverly Jean Poole, Houston, TX (US); Anthony Jay Dias, Houston, TX (US); Kriss Randall Karp, Copley, OH (US); Molly Westermann Johnston, Baytown, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 682 days.

(21) Appl. No.: 11/269,446

(22) Filed: Nov. 8, 2005

(65) Prior Publication Data

US 2008/0009579 A1    Jan. 10, 2008

(51) Int. Cl.
C08K 9/04 (2006.01)
C08K 5/17 (2006.01)
C08K 5/19 (2006.01)
C08K 3/34 (2006.01)
C01B 33/38 (2006.01)
C01B 33/40 (2006.01)
C01B 33/44 (2006.01)
C08L 15/02 (2006.01)

(52) U.S. Cl. ........ 524/445; 524/456; 524/493; 523/216; 525/70; 525/76; 525/86; 525/87; 525/98; 525/333.4; 977/778; 977/779

(58) Field of Classification Search .................. 524/445, 524/456, 493; 525/70, 76, 86, 87, 93, 98, 525/333.4; 523/216; 977/778, 779
See application file for complete search history.

(56) References Cited

U.S. PATENT DOCUMENTS

| 4,632,963 | A | 12/1986 | Gardner et al. | |
| 5,576,372 | A | 11/1996 | Kresge et al. | 524/442 |
| 5,576,373 | A | 11/1996 | Kresge et al. | 524/445 |
| 5,665,183 | A | 9/1997 | Kresge et al. | 152/204 |
| 5,807,629 | A | 9/1998 | Elspass et al. | 428/323 |
| 5,883,173 | A | 3/1999 | Elspass et al. | 524/446 |
| 5,936,023 | A | 8/1999 | Kato et al. | 524/445 |
| 5,973,053 | A | 10/1999 | Usuki et al. | 524/445 |
| 6,034,164 | A | 3/2000 | Elspass et al. | 524/445 |
| 6,060,549 | A | 5/2000 | Li et al. | 524/445 |
| 6,103,817 | A | 8/2000 | Usuki et al. | 524/574 |
| 6,121,361 | A | 9/2000 | Usuki et al. | 524/445 |
| 6,255,389 | B1 * | 7/2001 | Ouhadi et al. | 525/76 |
| 6,656,995 | B2 * | 12/2003 | Klendworth et al. | 524/445 |
| 7,425,591 | B2 * | 9/2008 | Dias et al. | 524/445 |
| 7,485,677 | B2 * | 2/2009 | Dias et al. | 524/445 |
| 7,491,764 | B2 * | 2/2009 | Dias et al. | 524/445 |
| 2004/0030036 | A1 | 2/2004 | Waddell et al. | |
| 2004/0127614 | A1 * | 7/2004 | Jiang et al. | 524/270 |
| 2004/0132894 | A1 * | 7/2004 | Dias et al. | 524/515 |
| 2005/0027057 | A1 * | 2/2005 | Dias et al. | 524/445 |
| 2005/0027058 | A1 * | 2/2005 | Dias et al. | 524/445 |
| 2005/0027062 | A1 | 2/2005 | Waddell et al. | |
| 2005/0277723 | A1 * | 12/2005 | Gong et al. | 524/445 |
| 2006/0100339 | A1 * | 5/2006 | Gong et al. | 524/445 |
| 2007/0238822 | A1 * | 10/2007 | Wang et al. | 524/445 |

FOREIGN PATENT DOCUMENTS

| EP | 0 992 538 | | 4/2000 |
| EP | 0 992 538 A1 * | | 4/2000 |
| WO | WO 94/22680 | | 10/1994 |
| WO | WO 01/85831 | | 11/2001 |
| WO | WO 02/48257 A2 * | | 6/2002 |
| WO | WO 0248257 A2 * | | 6/2002 |
| WO | WO 02/100935 | | 12/2002 |
| WO | WO 02/100936 | | 12/2002 |
| WO | WO 02100935 A1 * | | 12/2002 |
| WO | WO 02100936 A1 * | | 12/2002 |
| WO | WO 2004/005387 A1 * | | 1/2004 |
| WO | WO 2004/005388 A1 * | | 1/2004 |
| WO | WO 2004/009700 A1 * | | 1/2004 |
| WO | WO 2004/058874 | | 7/2004 |

OTHER PUBLICATIONS

Ray, Suprakas Sinha, and Masami Okamoto. Polymer/layered silicate nanocomposites: a review from preparation to processing. 2003. Progress in Polymer Science (28) pp. 1539-1641.*
Moneypenny et al., (2004) General Compounding. In: Rubber Compounding: Chemistry and Applications, Marcel Dekker, Inc. pp. 369, 394-396.*
Material Data Sheet for Cloisite 25A, Southern Clay Products, Inc.*

* cited by examiner

Primary Examiner — Milton I Cano
Assistant Examiner — Darcy D LaClair

(57) ABSTRACT

The present invention provides a nanocomposite of a star branched elastomer and a clay. The nanocomposite can be a mixture of a halogenated star branched elastomer and a clay, desirably an exfoliated clay, suitable for use as an air barrier. The halogenated star-branched elastomer can be the primary halogenated elastomer in the blend, and a ratio of the star-branched elastomer to clay can be from 2:1 to 500:1.

4 Claims, No Drawings

NANOCOMPOSITES AND METHODS FOR MAKING THE SAME

FIELD OF THE INVENTION

This invention relates to low-permeability nanocomposites useful for air barriers, processes to produce the same, and their use in articles of manufacture.

BACKGROUND OF THE INVENTION

Nanocomposites are polymer systems containing inorganic particles with at least one dimension in the nanometer range. Some examples of these are disclosed in U.S. Pat. Nos. 6,060,549, 6,103,817, 6,034,164, 5,973,053, 5,936,023, 5,883,173, 5,807,629, 5,665,183, 5,576,373, and 5,576,372. Common types of inorganic particles used in nanocomposites are phyllosilicates, an inorganic substance from the general class of so called "nano-clays" or "clays." Ideally, intercalation should take place in the nanocomposite, wherein the polymer inserts into the space or gallery between the clay surfaces. Ultimately, it is desirable to have exfoliation, wherein the polymer is fully dispersed with the individual nanometer-size clay platelets. Due to the general enhancement in air barrier qualities of various polymer blends when clays are present, there is a desire for a nanocomposite with low air permeability; especially a vulcanized elastomer nanocomposite such as used in the manufacture of tires.

The preparation of nanocomposites uses a number of methods to generate exfoliated clays. One of the most common methods relies upon the use of organically modified montmorillonite clays. Organoclays are typically produced through solution based ion-exchange reactions that replace sodium ions that exist on the surface of sodium montmorillonite with organic molecules such as alkyl or aryl ammonium compounds and typically known in the industry as swelling or exfoliating agents. See, e.g., U.S. Pat. No. 5,807,629, WO 02/100935, and WO 02/100936. Other background references include U.S. Pat. Nos. 5,576,373, 5,665,183, 5,807,629, 5,936,023, 6,121,361, WO 94/22680, WO 01/85831, and WO 04/058874.

Elastomeric nanocomposite innerliners and innertubes have been formed using a complexing agent and a rubber, where the agent is a reactive rubber having positively charged groups and a layered silicate uniformly dispersed therein. See, for example, Kresge et al. U.S. Pat. Nos. 5,665,183 and 5,576,373. This approach uses pre-formed positively charged reactive rubber components.

Nanocomposites have also been formed using non-ionic, brominated copolymers of isobutylene and para-methylstyrene, and blends of these copolymers with other polymers. See, for example, Elspass et al., U.S. Pat. Nos. 5,807,629, and 6,034,164. Star-branched polymers were disclosed as secondary blend polymers with brominated copolymers of isobutylene and para-methylstyrene in commonly assigned aforementioned WO 02/100935 and WO 02/100936 to Dias et al.

Although the above disclosed nanocomposites have resulted in nanocomposites having good barrier properties, there still exists a need to develop nanocomposites having minimal permeability which can be prepared from elastomers having good processability properties such as green strength and relaxation characteristics.

SUMMARY OF THE INVENTION

The present invention provides a nanocomposite having improved barrier properties and good processability properties. It has been found that the use of star-branched elastomers as the primary rubber (>50 phr) in a nanocomposite provides improved processing properties and decreased permeability of the nanocomposite. The nanocomposite of the present invention can include clay dispersed in a star-branched elastomer comprising an isoolefin monomer derived unit and a multiolefin derived unit. A ratio of the star-branched elastomer to clay in the nanocomposite can range from 2:1 to 500:1.

In one embodiment, the nanocomposite can include at least 50 phr of a star-branched elastomer comprising an isoolefin monomer derived unit and a multiolefin monomer derived unit; and clay dispersed therein. In other embodiments, the nanocomposite can include at least 60 phr, at least 70 phr, at least 80 phr, at least 90 phr, at least 95 phr, at least 98 phr, at least 99 phr, at least 99.5 phr, at least 99.9 phr, or 100 phr star-branched elastomer. The star-branched elastomer can be a copolymer of a $C_4$ to $C_7$ isoolefin and a multiolefin. In other embodiments, the elastomer can be a copolymer of a $C_4$ to $C_7$ isoolefin, a multiolefin, and an alkylstyrene. The multiolefin can be a $C_4$ to $C_{14}$ diene. The elastomer can include functional groups such as halides, ethers, amines, amides, esters, acids, and hydroxyls. The elastomer can be halogenated with bromine or chlorine.

In certain embodiments, the isoolefin can be isobutylene, the multiolefin can be isoprene, and/or the alkylstyrene can be para-methylstyrene. In particular embodiments, the clay can be inorganic clay or organoclay. In certain embodiments, the clay can be a silicate. The clay can be smectite clay, for example. In some embodiments, the smectite clay can be montmorillonite, nontronite, beidellite, bentonite, volkonskoite, laponite, hectorite, saponite, sauconite, magadite, kenyaite, stevensite, vermiculite, halloysite, hydrotalcite, or a combination thereof.

The nanocomposite can also include calcium carbonate, mica, silica, silicates, talc, titanium dioxide, carbon black, or mixtures thereof. In other embodiments, the nanocomposite can include dye, pigment, antioxidant, heat and light stabilizer, plasticizer, oil, or mixtures thereof. In other embodiments, the nanocomposite can include organic peroxide, zinc oxide, zinc stearate, stearic acid, an accelerator, a vulcanizing agent, or mixtures thereof.

The present invention also provides a method to form a nanocomposite comprising dispersing a clay in at least 50 phr of a star-branched elastomeric copolymer including an isoolefin monomer derived unit and a multiolefin monomer derived unit, wherein a ratio of the elastomer to clay is from 2:1 to 500:1. The method can include incorporating a curative into the nanocomposite. The method can further include curing the nanocomposite.

DETAILED DESCRIPTION

This invention describes a polymer/clay nanocomposite and a process for making polymer/clay nanocomposites. The process can produce a nanocomposite of a halogenated elastomer and clay, desirably exfoliated clay, suitable for use as an air barrier. The nanocomposite formed by the process of this invention has improved air barrier properties, good processing properties and is suitable for use as an innerliner or innertube.

As used herein, the new numbering scheme for the Periodic Table Groups is used as set forth in CHEMICAL AND ENGINEERING NEWS, 63(5), 27 (1985).

As used herein, "polymer" may be used to refer to homopolymers, copolymers, interpolymers, terpolymers, etc. Likewise, a copolymer may refer to a polymer comprising at least two monomers, optionally with other monomers.

As used herein, when a polymer is referred to as comprising a monomer, the monomer is present in the polymer in the polymerized form of the monomer or in the derivative form of the monomer. Likewise, when catalyst components are described as comprising neutral stable forms of the components, it is well understood by one skilled in the art, that the ionic form of the component is the form that reacts with the monomers to produce polymers.

As used herein, "elastomer" or "elastomeric composition" refers to any polymer or composition of polymers (such as blends of polymers) consistent with the ASTM D1566 definition. Elastomer includes mixed blends of polymers such as melt mixing, solution mixing, and/or reactor blends of polymers. The terms may be used interchangeably with the term "rubber."

As used herein, "phr" is 'parts per hundred rubber' and is a measure common in the art wherein components of a composition are measured relative to a major elastomer component, based upon 100 parts by weight of the elastomer(s) or rubber(s).

As used herein, "isobutylene based elastomer" or "isobutylene based polymer" refers to elastomers or polymers comprising at least 70 mole percent repeat units from isobutylene monomer.

As used herein, "isoolefin" refers to any olefin monomer having at least one carbon having two substitutions on that carbon.

As used herein, "multiolefin" refers to any monomer having two or more double bonds, for example, a multiolefin may be any monomer comprising two conjugated double bonds such as a conjugated diene such as isoprene.

As used herein, "nanocomposite" or "nanocomposite composition" refers to polymer systems containing inorganic particles with at least one dimension in the nanometer range within a polymer matrix.

As used herein, "intercalation" refers to the state of a composition in which a polymer is present between each layer of a platelet filler. As is recognized in the industry and by academia, some indicia of intercalation can be the shifting and/or weakening of detection of X-ray lines as compared to that of original platelet fillers, indicating a larger spacing between vermiculite layers than in the original mineral.

As used herein, "exfoliation" refers to the separation of individual layers of the original inorganic particle, so that polymer can surround or surrounds each platelet particle. In an embodiment, sufficient polymer is present between each platelet such that the platelets are randomly spaced. For example, some indication of exfoliation or intercalation may be an X-ray plot showing no peaks or larger d-spacing because of the random spacing or increased separation of layered platelets. However, as recognized in the industry and by academia, other indicia may be useful to indicate the results of exfoliation such as permeability testing, electron microscopy, atomic force microscopy, etc.

As used herein, "solvent" refers to any substance capable of dissolving another substance. When the term solvent is used it may refer to at least one solvent or two or more solvents unless specified. In certain embodiments, the solvent is polar; in other embodiments, the solvent is non-polar.

As used herein, "solution" refers to a uniformly dispersed mixture at the molecular level or ionic level, of one or more substances (solute) in one or more substances (solvent). For example, solution process refers to a mixing process in which both the elastomer and the modified layered filler remain in the same organic solvent or solvent mixtures.

As used herein, "suspension" refers to a system consisting of a solid dispersed in a solid, liquid, or gas usually in particles of larger than colloidal size.

As used herein, "emulsion" refers to a system consisting of a liquid or liquid suspension dispersed with or without an emulsifier in an immiscible liquid usually in droplets of larger than colloidal size.

As used herein, "hydrocarbon" refers to molecules or segments of molecules containing primarily hydrogen and carbon atoms. In some embodiments, hydrocarbon also includes halogenated versions of hydrocarbons and versions containing heteroatoms as discussed in more detail below.

Elastomer

The nanocomposite of the present invention includes at least one elastomer comprising $C_4$ to $C_7$ isoolefin derived units. The elastomer can be halogenated. The isoolefin may be a $C_4$ to $C_7$ compound, in one embodiment selected from isobutylene, isobutene, 2-methyl-1-butene, 3-methyl-1-butene, 2-methyl-2-butene, and 4-methyl-1-pentene. The elastomer may also include other monomer derived units. In one embodiment, the elastomer can include a styrenic monomer, which may be any substituted styrene monomer unit, and desirably is selected from styrene, α-methylstyrene or an alkylstyrene (ortho, meta, or para), the alkyl selected from any $C_1$ to $C_5$ alkyl or branched chain alkyl. In a desirable embodiment, the styrenic monomer is p-methylstyrene. In another embodiment, the elastomer includes at least one multiolefin, which may be a $C_4$ to $C_{14}$ diene, conjugated or not, in one embodiment selected from isoprene, butadiene, 2,3-dimethyl-1,3-butadiene, myrcene, 6,6-dimethyl-fulvene, hexadiene, cyclopentadiene, methylcyclopentadiene, piperylene and combinations thereof.

In one embodiment, the elastomer includes an isoolefin derived unit, and a multiolefin derived unit or a styrenic derived unit. In another embodiment, the elastomer includes an isoolefin derived unit and a styrenic derived unit, and in yet another embodiment the elastomer includes an isoolefin derived unit and a multiolefin derived unit.

The elastomers in one embodiment of the invention are random elastomeric copolymers of a $C_4$ to $C_7$ isoolefin, such as isobutylene and a para-alkylstyrene comonomer, preferably para-methylstyrene containing at least 80%, more preferably at least 90% by weight of the para-isomer and also include functionalized interpolymers wherein at least some of the alkyl substituents groups present in the styrene monomer units contain benzylic halogen or some other functional group. In another embodiment of the invention, the interpolymer is a random elastomeric copolymer of ethylene or a $C_3$ to $C_6$ α-olefin and a para-alkylstyrene comonomer, preferably para-methylstyrene containing at least 80%, more preferably at least 90% by weight of the para-isomer and also include functionalized interpolymers wherein at least some of the alkyl substituents groups present in the styrene monomer units contain benzylic halogen or some other functional group. Preferred materials may be characterized as interpolymers containing the following monomer units randomly spaced along the polymer chain:

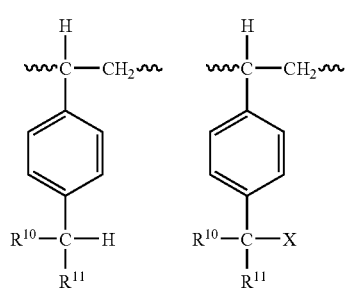

wherein $R^{10}$ and $R^{11}$ are independently hydrogen, lower alkyl, preferably $C_1$ to $C_7$ alkyl and primary or secondary alkyl halides and X is a functional group such as halogen. Preferably $R^{10}$ and $R^{11}$ are hydrogen. Up to 60 mole percent of the para-substituted styrene present in the interpolymer structure may be the functionalized structure above in one embodiment, and in another embodiment from 0.1 to 5 mole percent. In other embodiments, the amount of functionalized structure is from 0.2 to 3 mole percent, or from 0.4 to 1 mole percent.

The functional group X may be halogen or a combination of a halogen and some other functional group such which may be incorporated by nucleophilic substitution of benzylic halogen with other groups such as carboxylic acids; carboxy salts; carboxy esters, amides and imides; hydroxy; alkoxide; phenoxide; thiolate; thioether; xanthate; cyanide; nitrile; amino and mixtures thereof. These functionalized isoolefin copolymers, their method of preparation, methods of functionalization, and cure are more particularly disclosed in U.S. Pat. No. 5,162,445, and in particular, the functionalized amines as described below.

Most useful of such functionalized materials are elastomeric random interpolymers of isobutylene and para-methylstyrene containing from 0.5 to 20 mole percent para-methylstyrene, wherein up to 60 mole percent of the methyl substituent groups present on the benzyl ring contain a bromine or chlorine atom, preferably a bromine atom (para(bromomethylstyrene)), as well as a combination of para(bromomethylstyrene) and other functional groups such as ester and ether. Halogenated elastomers are commercially available as EXXPRO™ Elastomers (ExxonMobil Chemical Company, Houston Tex.). In a preferred embodiment, the functionality is selected such that it can react or form polar bonds with functional groups present in the matrix polymer, for example, acid, amino or hydroxyl functional groups, when the polymer components are mixed at high temperatures.

These functionalized interpolymers have a substantially homogeneous compositional distribution such that at least 95% by weight of the polymer has a para-alkylstyrene content within 20% of the average para-alkylstyrene content of the polymer. Desirable interpolymers are also characterized by a broad molecular weight distribution ($M_w/M_n$) of at least 2.5, more preferably at least 5, a preferred viscosity average molecular weight in the range of from 200,000 up to 2,000,000 and a preferred number average molecular weight in the range of from 25,000 to 750,000 as determined by gel permeation chromatography.

The EXXPRO™ polymers may be prepared by a slurry polymerization of the monomer mixture using a Lewis acid catalyst, followed by halogenation, preferably bromination, in solution in the presence of halogen and a radical initiator such as heat and/or light and/or a chemical initiator and, optionally, followed by electrophilic substitution of bromine with a different functional moiety.

Preferred EXXPRO™ polymers are brominated polymers that generally contain from 0.1 to 5 mole percent of bromomethylstyrene groups relative to the total amount of monomer derived units in the polymer. In another embodiment, the amount of bromomethyl groups is from 0.2 to 3.0 mole percent, and from 0.3 to 2.8 mole percent in yet another embodiment, and from 0.4 to 2.5 mole percent in yet another embodiment, and from 0.3 to 2.0 in yet another embodiment, wherein a desirable range may be any combination of any upper limit with any lower limit. Expressed another way, preferred copolymers contain from 0.2 to 10 weight percent of bromine, based on the weight of the polymer, from 0.4 to 6 weight percent bromine in another embodiment, and from 0.6 to 5.6 weight percent in another embodiment, are substantially free of ring halogen or halogen in the polymer backbone chain. In one embodiment of the invention, the interpolymer is a copolymer of $C_4$ to $C_7$ isoolefin derived units (or isomonoolefin), para-methylstyrene derived units and para-(halomethylstyrene) derived units, wherein the para-(halomethylstyrene) units are present in the interpolymer from 0.4 to 3.0 mole percent based on the total number of para-methylstyrene, and wherein the para-methylstyrene derived units are present from 3 weight percent to 15 weight percent based on the total weight of the polymer in one embodiment, and from 4 weight percent to 10 weight percent in another embodiment. In another embodiment, the para-(halomethylstyrene) is para-(bromomethylstyrene).

The halogenated elastomer particularly useful in the present invention may include a halogenated butyl rubber component. As used herein, "halogenated butyl rubber" refers to both butyl rubber and so-called "star-branched" butyl rubber, described below. In one embodiment of the invention, the halogenated rubber component is a halogenated copolymer of a $C_4$ to $C_7$ isoolefin and a multiolefin. In another embodiment, the halogenated rubber component is a blend of a polydiene or block copolymer, and a copolymer of a $C_4$ to $C_7$ isoolefin and a conjugated, or a "star-branched" butyl polymer. The halogenated butyl polymer useful in the present invention can thus be described as a halogenated elastomer comprising $C_4$ to $C_7$ isoolefin derived units, multiolefin derived units, and halogenated multiolefin derived units, and includes both "halogenated butyl rubber" and so called "halogenated star-branched" butyl rubber.

In one embodiment, the halogenated butyl rubber is brominated butyl rubber, and in another embodiment is chlorinated butyl rubber. General properties and processing of halogenated butyl rubbers is described in THE VANDERBILT RUBBER HANDBOOK 105-122 (Robert F. Ohm ed., R.T. Vanderbilt Co., Inc. 1990), and in RUBBER TECHNOLOGY 311-321 (Maurice Morton ed., Chapman & Hall 1995). Butyl rubbers, halogenated butyl rubbers, and star-branched butyl rubbers are described by Edward Kresge and H. C. Wang in 8 KIRK-OTHMER ENCYCLOPEDIA OF CHEMICAL TECHNOLOGY 934-955 (John Wiley & Sons, Inc. 4th ed. 1993).

The halogenated rubber component of the present invention includes, but is not limited to, brominated butyl rubber, chlorinated butyl rubber, star-branched polyisobutylene rubber, star-branched brominated butyl (polyisobutylene/isoprene copolymer) rubber; isobutylene-bromomethylstyrene copolymers such as isobutylene/meta-bromomethylstyrene, isobutylene/para-bromomethylstyrene, isobutylene/chloromethylstyrene, halogenated isobutylene cyclopentadiene, and isobutylene/para-chloromethylstyrene, and the like halomethylated aromatic interpolymers as in U.S. Pat. Nos. 4,074,035 and 4,395,506; isoprene and halogenated isobutylene copolymers, polychloroprene, and the like, and mixtures of any of the above. Some embodiments of the halogenated rubber component are also described in U.S. Pat. Nos. 4,703,091 and 4,632,963.

More particularly, in one embodiment of the brominated rubber component of the invention, a halogenated butyl rubber is used. The halogenated butyl rubber is produced from the halogenation of butyl rubber. Preferably, the olefin polymerization feeds employed in producing the halogenated butyl rubber of the invention are those olefinic compounds conventionally used in the preparation of butyl-type rubber polymers. The butyl polymers are prepared by reacting a comonomer mixture, the mixture having at least (1) a $C_4$ to $C_7$ isoolefin monomer component such as isobutylene with (2) a multiolefin, or conjugated diene, monomer component. The isoolefin is in a range from 70 to 99.5 weight percent by weight of the total comonomer mixture in one embodiment, and 85 to 99.5 weight percent in another embodiment. The conjugated diene component in one embodiment is present in the comonomer mixture from 30 to 0.5 weight percent in one embodiment, and from 15 to 0.5 weight percent in another embodiment. In yet another embodiment, from 8 to 0.5 weight percent of the comonomer mixture is conjugated diene.

The isoolefin is a $C_4$ to $C_7$ compound such as isobutylene, isobutene 2-methyl-1-butene, 3-methyl-1-butene, 2-methyl-2-butene, and 4-methyl-1-pentene. The multiolefin is a $C_4$ to $C_{14}$ conjugated diene such as isoprene, butadiene, 2,3-dimethyl-1,3-butadiene, myrcene, 6,6-dimethyl-fulvene, cyclopentadiene, hexadiene and piperylene. One embodiment of the butyl rubber polymer of the invention is obtained by reacting 92 to 99.5 weight percent of isobutylene with 0.5 to 8 weight percent isoprene, or reacting 95 to 99.5 weight percent isobutylene with from 0.5 to 5.0 weight percent isoprene in yet another embodiment.

Halogenated butyl rubber is produced by the halogenation of the butyl rubber product described above. Halogenation can be carried out by any means, and the invention is not herein limited by the halogenation process. Methods of halogenating polymers such as butyl polymers are disclosed in U.S. Pat. Nos. 2,631,984, 3,099,644, 4,554,326, 4,681,921, 4,650,831, 4,384,072, 4,513,116 and 5,681,901. In one embodiment, the halogen is in the so called II and III structures as discussed in, for example, RUBBER TECHNOLOGY at 298-299 (1995). In one embodiment, the butyl rubber is halogenated in hexane diluent at from 40 to 60° C. using bromine ($Br_2$) or chlorine ($Cl_2$) as the halogenation agent. The halogenated butyl rubber has a Mooney Viscosity of from 20 to 70 (ML 1+8 at 125° C.) in one embodiment, and from 25 to 55 in another embodiment. The halogen content is from 0.1 to 10 weight percent based in on the weight of the halogenated butyl rubber in one embodiment, and from 0.5 to 5 weight percent in another embodiment. In yet another embodiment, the halogen weight percent of the halogenated butyl rubber is from 1 to 2.2 weight percent.

In another embodiment, the halogenated butyl or star-branched butyl rubber may be halogenated such that the halogenation is primarily allylic in nature. This is typically achieved by such means as free radical bromination or free radical chlorination, or by such methods as secondary treatment of electrophilically halogenated rubbers, such as by heating the rubber, to form the allylic halogenated butyl and star-branched butyl rubber. Common methods of forming the allylic halogenated polymer are disclosed by Gardner et al. in U.S. Pat. Nos. 4,632,963; 4,649,178; 4,703,091. Thus, in one embodiment of the invention, the halogenated butyl rubber is such that the halogenated multiolefin units are primary allylic halogenated units, and wherein the primary allylic configuration is present to at least 20 mole percent (relative to the total amount of halogenated multiolefin) in one embodiment, and at least 30 mole percent in another embodiment. This arrangement can be described by the structure:

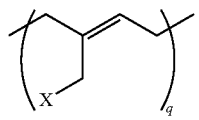

wherein X is a halogen, desirably chlorine or bromine, and q is at least 20 mole percent based on the total moles of halogen in one embodiment, and at least 30 mole percent in another embodiment, and from 25 mole percent to 90 mole percent in yet another embodiment.

A commercial embodiment of the halogenated butyl rubber of the present invention is EXXON™ Bromobutyl 2222 (ExxonMobil Chemical Company). Its Mooney Viscosity is from 27 to 37 (ML 1+8 at 125° C., ASTM 1646, modified), and the bromine content is from 1.8 to 2.2 weight percent relative to the polymer. Further, cure characteristics of Bromobutyl 2222 are as follows: MH is from 27 to 41 dN·m, ML is from 7.5 to 16.5 dN·m (ASTM D2084, modified). Another commercial embodiment of the halogenated butyl rubber is Bromobutyl 2255 (ExxonMobil Chemical Company). Its Mooney Viscosity is from 41 to 51 (ML 1+8 at 125° C., ASTM 1646, modified), and the bromine content is from 1.8 to 2.2 weight percent. Further, cure characteristics of Bromobutyl 2255 are as follows: MH is from 34 to 48 dN·m, ML is from 11.5 to 20.5 dN·m (ASTM D2084, modified). The invention is not limited to the commercial source of any of the halogenated rubber components.

In another embodiment of the rubber component of the invention, a branched or "star-branched" butyl rubber is used. In one embodiment, the star-branched butyl rubber is a composition of a butyl rubber, either halogenated or not, and star-branched structure. The halogenation process is described in detail in U.S. Pat. Nos. 4,074,035, 5,071,913, 5,286,804, 5,182,333 and 6,228,978. Star-branched butyl rubbers are described by Edward Kresge and H. C. Wang in 8 KIRK-OTHMER ENCYCLOPEDIA OF CHEMICAL TECHNOLOGY 934-955 (John Wiley & Sons, Inc. 4th ed. 1993).

The invention is not limited by the method of forming star-branched butyl rubbers. The polydienes/block copolymer, or branching agents (hereinafter "polydienes"), are typically cationically reactive and are present during the polymerization of the butyl or halogenated butyl rubber, or can be blended with the butyl or halogenated butyl rubber to form the desired star-branched butyl. The branching agent or polydiene can be any suitable branching agent, and the invention is not limited to the type of polydiene used to make the product.

In one embodiment, the star-branched butyl is typically a composition of the butyl or halogenated butyl rubber as described above and a copolymer of a polydiene and a partially hydrogenated polydiene selected from the group including styrene, polybutadiene, polyisoprene, polypiperylene, natural rubber, styrene-butadiene rubber, ethylene-propylene diene rubber, styrene-butadiene-styrene and styrene-isoprene-styrene block copolymers. These polydienes are present, based on the monomer weight percent, greater than 0.3 weight percent in one embodiment, and from 0.3 to 3 weight percent in another embodiment, and from 0.4 to 2.7 weight percent in yet another embodiment.

A commercial embodiment of the star-branched butyl of the present invention is EXXON™ SB Bromobutyl 6222 (ExxonMobil Chemical Company), having a Mooney Viscosity (ML 1+8 at 125° C., ASTM 1646, modified) of from 27 to 37, and a bromine content of from 2.2 to 2.6 weight percent relative to the polymer. Further, cure characteristics of SB Bromobutyl 6222 are as follows: MH is from 24 to 38 dN·m, ML is from 6.5 to 16.5 dN·m (ASTM D2084, modified).

The halogenated rubber component is present in the blend of the invention from 10 to 90 phr in one embodiment, from 20 to 80 phr in another embodiment, and from 30 to 70 phr in yet another embodiment, wherein a desirable range may be any combination of any upper phr limit with any lower phr limit.

In particular embodiments, the above star-branched halogenated butyl rubber component can be used as the primary elastomeric component in the blend of the invention, e.g. greater than 50 phr. For example, in one embodiment, a star-branched halogenated rubber can be used as the sole halogenated rubber component in the blend. In yet other embodiments, the star-branched elastomer can be the majority elastomeric component, where the amount of star-branched elastomer in the blend is greater than any other elastomer components, for example. Star-branched elastomers can, in some embodiments, improve green strength and relaxation characteristics, processability, and other properties of the composition.

Functionalized Halogenated Elastomers

The halogen in the above described halogenated polymer can react or form polar bonds with functional groups present in the matrix polymer, for example, acid, amino or hydroxyl functional groups, when the components are mixed at high temperatures. One embodiment of the present invention is a nanocomposite comprising a clay and a halogenated elastomer comprising $C_4$ to $C_7$ isoolefin derived units; wherein a portion of the halogen in the elastomer is electrophilically substituted with an amine-functionalized group such that the halogenated elastomer also comprises an amine-functionalized monomer unit described by the following group pendant to the elastomer E:

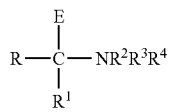

wherein R and $R^1$ are the same or different and are selected from hydrogen, $C_1$ to $C_7$ alkyls, and primary or secondary alkyl halides; and wherein $R^2$, $R^3$ and $R^4$ are the same or different and are selected from hydrogen, $C_1$ to $C_{20}$ alkyls, alkenes or aryls, substituted $C_1$ to $C_{20}$ alkyls, alkenes or aryls, $C_1$ to $C_{20}$ aliphatic alcohols or ethers, $C_1$ to $C_{20}$ carboxylic acids, nitriles, ethoxylated amines, acrylates, esters and ammonium ions. In a desirable embodiment, at least one of $R^2$, $R^3$ and $R^4$ are selected from $C_1$ to $C_{20}$ alkenes, $C_1$ to $C_{20}$ aliphatic alcohols, $C_1$ to $C_{20}$ aliphatic ethers, $C_1$ to $C_{20}$ carboxylic acids, nitriles, ethoxylated amines, acrylates, esters and ammonium ions.

In one embodiment, the halogenated elastomer E comprises $C_4$ to $C_7$ isoolefin derived units, para-methylstyrene derived units and para-(halomethylstyrene) derived units.

In another embodiment, the halogenated elastomer E comprises $C_4$ to $C_7$ isoolefin derived units, multiolefin derived units, and halogenated multiolefin derived units.

The functional group pendant to the elastomer E can be further described as functionalized amine, wherein at least one of $R^2$, $R^3$ and $R^4$ is selected from $C_1$ to $C_{20}$ aliphatic alcohols or ethers, $C_1$ to $C_{20}$ carboxylic acids, nitriles, esters, ammonium ions, or acrylate groups; wherein the acrylate is described by the following formula:

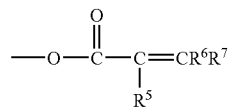

wherein $R^5$, $R^6$ and $R^7$ are the same or different and are selected from hydrogen and $C_1$ to $C_7$ alkyl or alkenyl.

In another embodiment, the amine-functionalized group is selected from ethoxylated amines having the following structure:

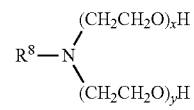

wherein $R^8$ is a $C_1$ to $C_{20}$ alkyl; and wherein x+y is 2, 5, 10, 15, or 50.

In another embodiment, the amine-functionalized group is selected from dimethylaminoethylacrylate, dimethylaaminomethylacrylate, N-methylamino-bis-2-propanol, N-ethylamino-bis-2-propanol, dimethylaminoethylmethacrylate, diethylaminopropanol, diethylethanolamine, dimethylamino-1-propanol, tripropanolamine, triethanolamine, aminolauric acid, betaine, and combinations thereof.

The amine-functionalized derived unit may be present on the halogenated elastomer from 0.01 weight percent to 10 weight percent of the elastomer in one embodiment, and from 0.1 weight percent to 8 weight percent in another embodiment, and from 0.2 to 6 weight percent in yet another embodiment, wherein a desirable range may be any combination of any upper weight percent limit with any lower weight percent limit.

In one embodiment, the functional group pendant to the elastomer E can be alternatively described as a polar polymer comprising a reaction product formed by reaction of a polymer with an acid or an acid anhydride. In other embodiments, the polar polymer can be formed by reaction of a polymer with an acid anhydride and an initiator. Although acids and acid anhydrides are referred to generally, one skilled in the art recognizes that incorporation of the acid or acid anhydride into the polymer can include derivatives and salts of the acid or acid anhydride.

In some embodiments, the acid anhydride can be an organic acid anhydride. The acid anhydride can be a carboxylic acid anhydride of one of the following general formulae:

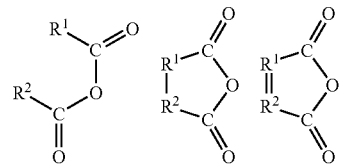

where R1 and R2 can be the same or different and are selected from C1 to C20 alkyls, alkenes or aryls, substituted C1 to C20 alkyls, alkenes or aryls, C1 to C20 aliphatic alcohols or ethers, nitriles, ethoxylated amines, acrylates, esters and ammonium ions. In some embodiments the acid anhydride can be maleic anhydride. In other embodiments the acid anhydride can be succinic anhydride. In other embodiments the acid anhydride can be a phosphoric acid anhydride or a thioanhydride. In yet other embodiments, the polar group can be a carboxamide. In some embodiments, the acid can be an organic acid. The acid can be a carboxylic acid, a dicarboxylic acid, a tricarboxylic acid, an oxo carboxylic acid, a peroxy acid, and the like. In other embodiments, the acid can be a thiocarboxylic acid, a sulfonic acid, a sulfinic acid, a xanthic acid, sulfenic acid, sulfamic acid, a phosphonic acid, an amic acid, an azinic acid, an azonic acid, a hydroxamic acid, an imidic acid, an imino acid, a nitrosolic acid, a nitrolic acid, a hydrazonic acid, or mixtures thereof.

In other embodiments, the polar functionalized polymer can be formed by reaction of the polymer with an acid anhydride and an initiator. In a particular embodiment, an initiator may be a member of the peroxide family. Particularly useful peroxides include peresters, perketals, and peroxycarbonates. In some embodiments, the peroxide can be a peroxybenzoate. Commercial quantities of these compounds can be obtained from Akzo Nobel, Arkema, Aztec, and others. As is well known to one skilled in the art, such peroxides are selected on the basis of their decomposition rates at different temperatures. Such half-life information is available from the suppliers. The concentration of initiator used to react the polymer and the acid or acid anhydride can range from about 0 ppm to about 600 ppm or more. In still other embodiments of the present invention the initiator may include a combination of initiators. One skilled in the art will realize that these concentrations are not limiting and any concentrations yielding a polymer product with the desirable properties may be employed.

For example, in some embodiments, the polar polymer can be a polyisobutylene succinic anhydride, a reaction product of polyisobutylene and succinic anhydride. In other embodiments, the polar oligomer or polymer can be a reaction product of the halogenated elastomer described above and maleic anhydride. In other embodiments, the halogenated elastomer and maleic anhydride are reacted in the presence of an initiator such as tert-butyl peroxybenzoate for example.

The acid or acid anhydride derived unit may be present on the polymer from 0.01 weight percent to 10 weight percent of the polymer in one embodiment, and from 0.1 weight percent to 8 weight percent in another embodiment, and from 0.2 to 7 weight percent in yet another embodiment, wherein a desirable range may be any combination of any upper weight percent limit with any lower weight percent limit. Where the elastomer may contain functional groups, the polar polymer can contain a higher content of functional groups and/or a different functional group or groups, e.g. a type of functional group that is more polar than the functional groups of the elastomer, so as to improve exfoliation, intercalation, gas barrier properties, and polymer blend compatibility.

The combined polymer component of the nanocomposites of the present invention may comprise at least one polymer or elastomer as described in any of the above polymer or elastomers or may comprise any combination of at least two or more of the polymers and elastomers described above. In an embodiment, the elastomer or polymer comprises at least one isobutylene-based polymer. In another embodiment, the elastomer or polymer comprises at least one isobutylene-based polymer and at least one other rubber. In yet another embodiment, the elastomer or polymer comprises at least two or more isobutylene-based polymers.

Secondary Rubber Component

A secondary rubber or "general purpose rubber" component may be present in compositions and end use articles of the present invention. These rubbers include, but are not limited to, natural rubbers, polyisoprene rubber, poly(styrene-co-butadiene) rubber (SBR), polybutadiene rubber (BR), poly(isoprene-co-butadiene) rubber (IBR), styrene-isoprene-butadiene rubber (SIBR), ethylene-propylene rubber (EPM), ethylene-propylene-diene rubber (EPDM), polysulfide, nitrile rubber, propylene oxide polymers, star-branched butyl rubber and halogenated star-branched butyl rubber, brominated butyl rubber, chlorinated butyl rubber, star-branched polyisobutylene rubber, star-branched brominated butyl (polyisobutylene/isoprene copolymer) rubber; poly(isobutylene-co-p-methylstyrene) and halogenated poly(isobutylene-co-p-methylstyrene), such as, for example, terpolymers of isobutylene derived units, p-methylstyrene derived units, and p-bromomethylstyrene derived units, and mixtures thereof.

A desirable embodiment of the secondary rubber component present is natural rubber. Natural rubbers are described in detail by Subramaniam in RUBBER TECHNOLOGY 179-208 (Maurice Morton, Chapman & Hall 1995). Desirable embodiments of the natural rubbers of the present invention are selected from Malaysian rubber such as SMR CV, SMR 5, SMR 10, SMR 20, and SMR 50 and mixtures thereof, wherein the natural rubbers have a Mooney viscosity at 100° C. (ML 1+4) of from 30 to 120, more preferably from 40 to 65. The Mooney viscosity test referred to herein is in accordance with ASTM D-1646.

Polybutadiene (BR) rubber is another desirable secondary rubber useful in the composition of the invention. The Mooney viscosity of the polybutadiene rubber as measured at 100° C. (ML 1+4) may range from 35 to 70, from 40 to about 65 in another embodiment, and from 45 to 60 in yet another embodiment. Some commercial examples of these synthetic rubbers useful in the present invention are NATSYN™ (Goodyear Chemical Company), and BUDENE™ 1207 or BR 1207 (Goodyear Chemical Company). A desirable rubber is high cis-polybutadiene (cis-BR). By "cis-polybutadiene" or "high cis-polybutadiene", it is meant that 1,4-cis polybutadiene is used, wherein the amount of cis component is at least 95%. An example of a high cis-polybutadiene commercial product used in the composition is BUDENE™ 1207.

Rubbers of ethylene and propylene derived units such as EPM and EPDM are also suitable as secondary rubbers. Examples of suitable comonomers in making EPDM are ethylidene norbornene, 1,4-hexadiene, dicyclopentadiene, as well as others. These rubbers are described in RUBBER TECHNOLOGY 260-283 (1995). A suitable ethylene-propylene rubber is commercially available as VISTALON™ (ExxonMobil Chemical Company, Houston Tex.).

In another embodiment, the secondary rubber is a halogenated rubber as part of the terpolymer composition. The halogenated butyl rubber is brominated butyl rubber, and in another embodiment is chlorinated butyl rubber. General properties and processing of halogenated butyl rubbers is described in THE VANDERBILT RUBBER HANDBOOK 105-122 (Robert F. Ohm ed., R.T. Vanderbilt Co., Inc. 1990), and in RUBBER TECHNOLOGY 311-321 (1995). Butyl rubbers, halogenated butyl rubbers, and star-branched butyl rubbers are described by Edward Kresge and H. C. Wang in 8 KIRK-OTHMER ENCYCLOPEDIA OF CHEMICAL TECHNOLOGY 934-955 (John Wiley & Sons, Inc. 4th ed. 1993).

The secondary rubber component of the present invention includes, but is not limited to at least one or more of brominated butyl rubber, chlorinated butyl rubber, star-branched polyisobutylene rubber, star-branched brominated butyl (polyisobutylene/isoprene copolymer) rubber; halogenated poly(isobutylene-co-p-methylstyrene), such as, for example, terpolymers of isobutylene derived units, p-methylstyrene derived units, and p-bromomethylstyrene derived units (BrIBMS), and the like halomethylated aromatic interpolymers as in U.S. Pat. Nos. 5,162,445; 4,074,035; and 4,395, 506; halogenated isoprene and halogenated isobutylene copolymers, polychloroprene, and the like, and mixtures of any of the above. Some embodiments of the halogenated rubber component are also described in U.S. Pat. Nos. 4,703, 091 and 4,632,963.

In one embodiment of the invention, a so called semi-crystalline copolymer ("SCC") is present as the secondary "rubber" component. Semi-crystalline copolymers are described in WO00/69966. Generally, the SCC is a copolymer of ethylene or propylene derived units and α-olefin derived units, the α-olefin having from 4 to 16 carbon atoms in one embodiment, and in another embodiment the SCC is a copolymer of ethylene derived units and α-olefin derived units, the α-olefin having from 4 to 10 carbon atoms, wherein the SCC has some degree of crystallinity. In a further embodiment, the SCC is a copolymer of 1-butene derived units and another α-olefin derived unit, the other α-olefin having from 5 to 16 carbon atoms, wherein the SCC also has some degree of crystallinity. The SCC can also be a copolymer of ethylene and styrene.

The secondary rubber component of the elastomer composition may be present in a range from up to 90 phr in one embodiment, from up to 50 phr in another embodiment, from up to 40 phr in another embodiment, and from up to 30 phr in yet another embodiment. In yet another embodiment, the secondary rubber is present from at least 2 phr, and from at least 5 phr in another embodiment, and from at least 5 phr in yet another embodiment, and from at least 10 phr in yet another embodiment. A desirable embodiment may include any combination of any upper phr limit and any lower phr limit. For example, the secondary rubber, either individually or as a blend of rubbers such as, for example NR and BR, may be present from 5 phr to 90 phr in one embodiment, and from 10 to 80 phr in another embodiment, and from 30 to 70 phr in yet another embodiment, and from 40 to 60 phr in yet another embodiment, and from 5 to 50 phr in yet another embodiment, and from 5 to 40 phr in yet another embodiment, and from 20 to 60 phr in yet another embodiment, and from 20 to 50 phr in yet another embodiment, the chosen embodiment depending upon the desired end use application of the composition.

Fillers, Curatives and Other Additives

The composition of the invention may also include one or more filler components such as calcium carbonate, clay, mica, silica and silicates, talc, titanium dioxide, and carbon black. As used herein, fillers do not include inorganic clay and/or organoclay particles forming part of the nanocomposite matrix, e.g. clay particles having a dimension in the nanometer range, but larger clay particles can be used as a filler in the nanocomposites, if desired. In one embodiment, the filler is carbon black or modified carbon black. The preferred filler is semi-reinforcing grade carbon black present at a level of from 10 to 150 phr of the blend, more preferably from 30 to 120 phr. Useful grades of carbon black as described in RUBBER TECHNOLOGY 59-85 (1995) range from N110 to N990. More desirably, embodiments of the carbon black useful in, for example, tire treads are N229, N351, N339, N220, N234 and N110 provided in ASTM (D3037, D1510, and D3765). Embodiments of the carbon black useful in, for example, sidewalls in tires are N330, N351, N550, N650, N660, and N762. Embodiments of the carbon black useful in, for example, innerliners for tires are N550, N650, N660, N762, and N990.

The composition of this invention may optionally include curative systems which are capable of curing the functionalized elastomeric copolymer component of the blend to provide vulcanizable compositions. Suitable curative systems for the elastomeric copolymer component of the present invention include organic peroxides, zinc oxide in combination with zinc stearate or stearic acid and, optionally, one or more of the following accelerators or vulcanizing agents: Permalux (di-ortho-tolylguanidine salt of dicatechol borate), HVA-2 (m-phenylene bis maleimide), Zisnet (2,4,6-trimercapto-5triazine), ZDEDC (zinc diethyl dithiocarbamate) and other dithiocarbamates, Tetrone A (dipenta-methylene thiuram hexasulfide), Vultac-5 (alkylated phenol disulfide), SP1045 (phenol formaldehyde resin), SP1056 (brominated alkyl phenol formaldehyde resin), DPPD. (diphenyl phenylene diamine), salicyclic acid (o-hydroxy benzoic acid), wood rosin (abietic acid), and TMTDS (tetramethyl thiuram disulfide) in combination with sulfur. The composition may also be cured using ultraviolet light or electron irradiation.

The compositions of the invention may also contain other conventional additives such as dyes, pigments, antioxidants, heat and light stabilizers, plasticizers, oils and other ingredients as known in the art.

Blending of the fillers, additives, and/or curative components may be carried out by combining the desired components and the nanocomposite of the present invention in any suitable mixing device such as a Banbury™ mixer, Brabender™ mixer or preferably a mixer/extruder and mixing at temperatures in the range of 120° C. up to 300° C. under conditions of shear sufficient to allow the components to become uniformly dispersed within the polymer to form the nanocomposite.

Clays

The nanocomposites of the present invention can include swellable inorganic clay or organoclay. Swellable layered inorganic clay materials suitable for the purposes of this invention include natural or synthetic phyllosilicates, particularly smectic clays such as montmorillonite, nontronite, beidellite, volkonskoite, laponite, hectorite, saponite, sauconite, magadite, kenyaite, stevensite and the like, as well as vermiculite, halloysite, aluminate oxides, hydrotalcite and the like. These layered clays generally comprise particles containing a plurality of silicate platelets having a thickness of 8-12 Å tightly bound together at interlayer spacings of 4 Å or less, and contain exchangeable cations such as $Na^+$, $Ca^{+2}$, $K^+$ or $Mg^{+2}$ present at the interlayer surfaces.

The layered clay can be exfoliated by suspending the clay in a water solution. Preferably, the concentration of clay in water is sufficiently low to minimize the interaction between clay particles and to fully exfoliate the clay. In one embodiment, the aqueous slurry of clay can have a clay concentration of between 0.1 and 5.0 weight percent; between 0.1 and 3.0 weight percent in other embodiments.

In certain embodiments, an aqueous slurry of clay can be prepared by stirring clay and water at room temperature for a time sufficient to exfoliate the clay. In one embodiment, the clay and water can be stirred for between 0.25 and 24 hours. The clay and water can be stirred for between 4 and 16 hours, or between 10 and 14 hours, in other embodiments.

In other embodiments, the clay can be mixed with an organic liquid to form a clay dispersion. The clay can be an inorganic clay or an organically modified clay; the organic liquid can be miscible or immiscible in water. In certain embodiments, the dispersion can have a clay concentration of between 0.1 and 5.0 weight percent; between 0.1 and 3.0 weight percent in other embodiments.

The layered clay can also be intercalated and exfoliated by treatment with organic molecules (swelling or exfoliating "agents" or "additives") capable of undergoing ion exchange reactions with the cations present at the interlayer surfaces of the layered silicate. Suitable exfoliating additives include cationic surfactants such as ammonium ion, alkylamines or alkylammonium ion (primary, secondary, tertiary and quaternary), phosphonium or sulfonium derivatives of aliphatic, aromatic or arylaliphatic amines, phosphines and sulfides. Desirable amine compounds (or the corresponding ammonium ion) are those with the structure $R^{12}R^{13}R^{14}N$, wherein $R^{12}$, $R^{13}$, and $R^{14}$ are $C_1$ to $C_{30}$ alkyls or alkenes in one embodiment, $C_1$ to $C_{20}$ alkyls or alkenes in another embodiment, which may be the same or different. In one embodiment, the exfoliating agent is a so called long chain tertiary amine, wherein at least $R^{12}$ is a $C_{14}$ to $C_{20}$ alkyl or alkene.

The exfoliating agent can also be a diamine compound (or the corresponding ammonium or diammonium ion), such as diaminoalkane, N-alkyl-diaminoalkane, N,N-dialkyl-diaminoalkyl, N,N,N'-trialkyl-diaminoalkane, N,N,N',N'-tetraalkyl-diaminoalkane, or the like. Desirable diamines can have the structure $R^{18}R^{19}N—R^{20}—NR^{21}R^{22}$, wherein $R^{18}$, $R^{19}$, $R^{20}$, $R^{21}$, and $R^{22}$ are the same or different $C_1$ to $C_{30}$ alkyls or alkenes, or $C_1$ to $C_{20}$ alkyls or alkenes. When a long chain diamine is desired, at least one of the N-alkyl or N-alkene groups has from 8 to 30 carbon atoms, preferably from 14 to 20 carbon atoms. Specific non-limiting, illustrative examples include N-coco-1,3-diaminopropane, N-oleyl-1,3-diaminopropane, N-tallow-1,3-diaminopropane, N,N,N'-trimethyl-N'-tallow-1,3-diaminopropane, and so on.

Another class of exfoliating additives include those which can be covalently bonded to the interlayer surfaces. These include polysilanes of the structure —Si$(R^{15})_2R^{16}$ where $R^{15}$ is the same or different at each occurrence and is selected from alkyl, alkoxy or oxysilane and $R^{16}$ is an organic radical compatible with the matrix polymer of the composite.

Other suitable exfoliating additives include protonated amino acids and salts thereof containing 2-30 carbon atoms such as 12-aminododecanoic acid, epsilon-caprolactam and like materials. Suitable swelling agents and processes for intercalating layered silicates are disclosed in U.S. Pat. Nos. 4,472,538, 4,810,734, 4,889,885 as well as WO92/02582.

In a preferred embodiment of the invention, the exfoliating additive or additives are capable of reaction with the halogen sites on the interpolymer to form complexes which help exfoliate the clay. In one embodiment, the additive includes all primary, secondary and tertiary amines and phosphines; alkyl and aryl sulfides and thiols; and their polyfunctional versions. Desirable additives include: long-chain tertiary amines such as N,N-dimethyl-octadecylamine, N,N-dioctadecyl-methylamine, so called dihydrogenated tallowalkyl-methylamine and the like, and amine-terminated polytetrahydrofuran; long-chain thiol and thiosulfate compounds like hexamethylene sodium thiosulfate.

The exfoliating additive such as described herein is present in the composition in an amount to achieve optimal air retention as measured by the permeability testing described herein. For example, the additive may be present from 0.1 to 20 phr in one embodiment, and from 0.2 to 15 phr in yet another embodiment, and from 0.3 to 10 phr in yet another embodiment. The exfoliating additive may be added to the composition at any stage; for example, the additive may be added to the interpolymer, followed by addition of the clay, or may be added to the interpolymer and clay mixture; or the additive may be first blended with the clay, followed by blending with the interpolymer in yet another embodiment.

In another embodiment of the invention, improved interpolymer impermeability is achieved by the presence of at least one polyfunctional curative. An embodiment of such polyfunctional curatives can be described by the formula Z—$R^{17}$—Z', wherein $R^{17}$ is one of a $C_1$ to $C_{15}$ alkyl, $C_2$ to $C_{15}$ alkenyl, and $C_6$ to $C_{12}$ cyclic aromatic moiety, substituted or unsubstituted; and Z and Z' are the same or different and are one of a thiosulfate group, mercapto group, aldehyde group, carboxylic acid group, peroxide group, alkenyl group, or other similar group that is capable of crosslinking, either intermolecularly or intramolecularly, one or more strands of a polymer having reactive groups such as unsaturation. So-called bis-thiosulfate compounds are an example of a desirable class of polyfunctional compounds included in the above formula. Non-limiting examples of such polyfunctional curatives are as hexamethylene bis(sodium thiosulfate) and hexamethylene bis(cinnamaldehyde), and others are well known in the rubber compounding arts. These and other suitable agents are disclosed in, for example, the BLUE BOOK, MATERIALS, COMPOUNDING INGREDIENTS, MACHINERY AND SERVICES FOR RUBBER (Don. R. Smith, ed., Lippincott & Petto Inc. 2001). The polyfunctional curative, if present, may be present in the composition from 0.1 to 8 phr in one embodiment, and from 0.2 to 5 phr in yet another embodiment.

Treatment with the swelling agents described above results in intercalation or "exfoliation" of the layered platelets as a consequence of a reduction of the ionic forces holding the layers together and introduction of molecules between layers which serve to space the layers at distances of greater than 4 Å, preferably greater than 9 Å. This separation allows the layered silicate to more readily sorb polymerizable monomer material and polymeric material between the layers and-facilitates further delamination of the layers when the intercalate is shear mixed with matrix polymer material to provide a uniform dispersion of the exfoliated layers within the polymer matrix.

The amount of clay or exfoliated clay incorporated in the nanocomposites in accordance with this invention is sufficient to develop an improvement in the mechanical properties or barrier properties of the nanocomposite, for example, tensile strength or oxygen permeability. Amounts of clay in the nanocomposite generally will range from 0.5 to 10 weight percent in one embodiment, and from 1 to 5 weight percent in another embodiment, based on the polymer content of the nanocomposite. Expressed in parts per hundred rubber, the clay or exfoliated clay may be present from 1 to 30 phr in one embodiment, and from 5 to 20 phr in another embodiment.

Nanocomposite Processing

Nanocomposites can be formed using a variety of processes, such as emulsion blending, solution blending, and melt blending. For example, in commonly assigned U.S. application Ser. No. 11/183,361 by Gong et al., filed Jul. 18, 2005, there is disclosed a method for preparing clay-butyl rubber nanocomposites from an emulsion of rubber solution and aqueous clay dispersion in which the clay can be an inorganic clay. However, by no means are these processes exhaustive of nanocomposite productions.

Melt Blending:

The nanocomposite of the present invention can be formed by a polymer melt blending process. Blending of the components can be carried out by combining the polymer components and the clay in the form of an intercalate in any suitable mixing device such as a Banbury™ mixer, Brabender™ mixer or preferably a mixer/extruder and mixing at temperatures in the range of 120° C. up to 300° C. under conditions of shear sufficient to allow the clay intercalate to exfoliate and become uniformly dispersed within the polymer to form the nanocomposite.

Emulsion Processes:

The nanocomposite of the present invention can also be formed by an emulsion processes. In one embodiment, the emulsion process can comprise mixing an aqueous slurry of inorganic clay with a polymer solution (cement). The mixing should be sufficiently vigorous to form emulsions or microemulsions. In some embodiments, the emulsions can be formed as an aqueous solution or suspension in an organic solution. Standard methods and equipment for both lab and large-scale production, including batch and continuous processes may be used to produce the polymeric nanocomposites of the invention.

In certain embodiments, a nanocomposite is produced by a process comprising contacting Solution A comprising water and at least one layered clay with Solution B comprising a solvent and at least one elastomer; and removing the solvent and water from the contact product of Solution A and Solution B to recover a nanocomposite. In certain embodiments, the emulsion is formed by subjecting the mixture to agitation using a high-shear mixer.

In some embodiments, a nanocomposite is produced by a process comprising contacting Solution A comprising water and at least one layered clay with Solution B comprising a solvent and at least one elastomer, wherein the contacting is performed in the presence of an emulsifier or surfactant.

The emulsions of the present invention are formed by conventional emulsion technology, that is, subjecting a mixture of the hydrocarbon, water and surfactant, when used, to sufficient shearing, as in a commercial blender or its equivalent for a period of time sufficient for forming the emulsion, e.g., generally at least a few seconds. For general emulsion information, see generally, "Colloidal Systems and Interfaces", S. Ross and I. D. Morrison, J. W. Wiley, NY, 1988. The emulsion can be allowed to remain in emulsion form, with or without continuous or intermittent mixing or agitation, with or without heating or other temperature control, for a period sufficient to enhance exfoliation of the clay, from 0.1 to 100 hours or more in one embodiment, from 1 to 50 hours in another embodiment, and from 2 to 20 hours in another embodiment.

When used, the surfactant concentration is sufficient to allow the formation of a relatively stable emulsion. Preferably, the amount of surfactant employed is at least 0.001 weight percent of the total emulsion, more preferably about 0.001 to about 3 weight percent, and most preferably 0.01 to less than 2 weight percent.

Cationic surfactants useful in preparing the emulsions of this invention include tertiary amines, diamines, polyamines, amine salts, as well as quaternary ammonium compounds. Non-ionic surfactants useful in preparing the emulsions of this invention include alkyl ethoxylates, linear alcohol ethoxylates, alkyl glucosides, amide ethoxylates, amine ethoxylates (coco-, tallow-, and oleyl-amine ethoxylates for example), phenol ethoxylates, and nonyl phenol ethoxylates.

Solution Blending:

The nanocomposite of the present invention can also be formed by solution blending. In certain embodiments, a nanocomposite is produced by a process comprising contacting Solution A comprising a solvent comprising a hydrocarbon and at least one layered filler or clay with Solution B comprising a solvent and at least one elastomer, and removing the solvents from the contact product of Solution A and Solution B to form a nanocomposite.

In the previous embodiments, the layered filler may be a layered clay treated with organic molecules as described above. In yet another embodiment, a nanocomposite is produced by a process comprising contacting at least one elastomer and at least one layered filler in a solvent; and removing the solvent from the contact product to form a nanocomposite.

In another embodiment, a nanocomposite is produced by a process comprising contacting at least one elastomer and at least one layered filler in a solvent mixture comprising two solvents; and removing the solvent mixture from the contact product to form a nanocomposite.

In still another embodiment, a nanocomposite is produced by a process comprising contacting at least one elastomer and at least one layered filler in a solvent mixture comprising at least two or more solvents; and removing the solvent mixture from the contact product to form a nanocomposite.

In another embodiment, a nanocomposite is produced by a process to form a contact product comprising dissolving at least one elastomer and then dispersing at least one layered filler in a solvent or solvent mixture comprising at least two solvents; and removing the solvent mixture from the contact product to form a nanocomposite.

In yet another embodiment, a nanocomposite is produced by a process to form a contact product comprising dispersing at least one layered filler and then dissolving at least one elastomer in a solvent or solvent mixture comprising at least two solvents; and removing the solvent mixture from the contact product to form a nanocomposite.

In the embodiments described above, solvents may be present in the production of the nanocomposite composition from 30 to 99 wt %, alternatively from 40 to 99 wt %, alternatively from 50 to 99 wt %, alternatively from 60 to 99 wt %, alternatively from 70 to 99 wt %, alternatively from 80 to 99 wt %, alternatively from 90 to 99 wt %, alternatively from 95 to 99 wt %, based upon the total wt of the composition.

Additionally, in certain embodiments, when two or more solvents are prepared in the production of the nanocomposite composition, each solvent may comprise from 0.1 to 99.9 vol %, alternatively from 1 to 99 vol %, alternatively from 5 to 95 vol %, and alternatively from 10 to 90 vol %, with the total volume of all solvents present at 100 vol %.

In still other embodiments, a nanocomposite formed from an above described process to improve the air impermeability of an elastomer has an oxygen transmission rate of 150 mm.cc/[m2.day] at 40° C. or lower as measured on cured nanocomposite compositions or articles as described herein.

Alternatively, the oxygen transmission rate is 150 mm.cc/[m2.day] at 40° C. or lower, 140 mm.cc/[m2.day] at 40° C. or lower, 130 mm.cc/[m2.day] at 40° C. or lower, 120 mm.cc/[m2.day] at 40° C. or lower, 110 mm.cc/[m2.day] at 40° C. or lower, 100 mm.cc/[m2.day] at 40° C. or lower, 90 mm.cc/[m2.day] at 40° C. or lower, or 80 mm.cc/[m2.day] at 40° C. or lower, as measured on cured nanocomposite compounds as described herein.

The composition of this invention may be extruded, compression molded, blow molded or injection molded into various shaped articles including fibers, films, industrial parts such as automotive parts, appliance housings, consumer products, packaging and the like. The resulting articles exhibit both high impact strength and low vapor permeability. In particular, the composition described herein is useful for air barriers such as bladders, and automotive (including truck, commercial and/or passenger) or aircraft innerliners and innertubes.

For certain jurisdictions, embodiments of the invention also provide for the following:

1. A nanocomposite comprising:
    at least 50 phr of a star-branched elastomer comprising an isoolefin monomer derived unit and a multiolefin monomer derived unit; and
    clay at least partially dispersed therein.
2. The nanocomposite of claim 1 wherein the elastomer comprises a copolymer of a $C_4$ to $C_7$ isoolefin and a multiolefin.
3. The nanocomposite of claim 1 or 2 wherein the elastomer comprises a copolymer of a $C_4$ to $C_7$ isoolefin, a multiolefin, and an alkylstyrene.
4. The nanocomposite of claim 3 wherein the alkylstyrene comprises para-methylstyrene.
5. The nanocomposite of any one of claims 1 to 4 wherein the multiolefin comprises a $C_4$ to $C_{14}$ diene.
6. The nanocomposite of any one of claims 1 to 5 wherein the elastomer comprises functional groups selected from the group consisting of halides, ethers, amines, amides, esters, acids, and hydroxyls.

7. The nanocomposite of any one of claims 1 to 6 wherein the elastomer is halogenated with bromine or chlorine.
8. The nanocomposite of any one of claims 1 to 7 wherein the isoolefin comprises isobutylene.
9. The nanocomposite of any one of claims 1 to 8 wherein the multiolefin is isoprene.
10. The nanocomposite of any one of claims 1 to 9 wherein the clay comprises an inorganic clay.
11. The nanocomposite of any one of claims 1 to 10 wherein the clay comprises an organoclay.
12. The nanocomposite of any one of claims 1 to 11 wherein the clay comprises a silicate.
13. The nanocomposite of any one of claims 1 to 12 wherein the clay comprises smectite clay.
14. The nanocomposite of claim 13 wherein the smectite clay comprises montmorillonite, nontronite, beidellite, bentonite, volkonskoite, laponite, hectorite, saponite, sauconite, magadite, kenyaite, stevensite, vermiculite, halloysite, hydrotalcite, or a combination thereof.
15. The nanocomposite of claim 13 wherein the smectite clay comprises montmorillonite, bentonite, vermiculite, or a combination thereof.
16. The nanocomposite of any one of claims 1 to 15 further comprising a filler selected from calcium carbonate, mica, silica, silicates, talc, titanium dioxide, carbon black, or mixtures thereof.
17. The nanocomposite of any one of claims 1 to 16 further comprising dye, pigment, antioxidant, heat and light stabilizer, plasticizer, oil, or mixtures thereof.
18. The nanocomposite of claim 1 further comprising organic peroxide, zinc oxide, zinc stearate, stearic acid, an accelerator, a vulcanizing agent, or mixtures thereof.
19. A method to form a nanocomposite comprising at least partially dispersing a clay in a star-branched elastomeric copolymer comprising an isoolefin monomer derived unit and a multiolefin monomer derived unit, wherein a ratio of the elastomer to clay is from 2:1 to 500:1, and wherein the star-branched elastomeric copolymer is present in the nanocomposite in an amount of at least 50 phr.
20. The method of claim 19 further comprising incorporating a curative into the nanocomposite.
21. The method of claim 20 further comprising curing the nanocomposite.
22. The method of any one of claims 19, 20 or 21 comprising melt mixing the clay with the copolymer.
23. The method of any one of claims 19, 20 or 21 comprising mixing the clay with the copolymer in an emulsion, suspension or solution.

Permeability Testing

For each of the following examples, the nanocomposites formed were analyzed for permeability properties using the following method. In certain embodiments, 36 grams of the clay-rubber mixture was loaded into a Brabender® mixer at a temperature of 130-145° C. and mixed with 20 grams of carbon black (N660) for 7 minutes. The mixture was further mixed with a curatives package of 0.33 g stearic acid, 0.33 g Kadox® 911, and 0.33 g MBTS at 40° C. and 40 rpm for 3 minutes. The resulting rubber compounds were milled, compression molded and cured at 170° C. All specimens were compression molded with slow cooling to provide defect free pads. A compression and curing press was used for rubber samples. Typical thickness of a compression molded pad is around 0.38 mm (15 mil) using an Arbor press, and 5.1 cm (2 in.) diameter disks were punched out from molded pads for permeability testing. These disks were conditioned in a vacuum oven at 60° C. overnight prior to the measurement. The oxygen permeation measurements were done using a Mocon™ OX-TRAN 2/61 permeability tester at 40° C. under the principle of R. A. Pasternak et. al. in 8 JOURNAL OF POLYMER SCIENCE: PART A-2 467 (1970). Disks thus prepared were mounted on a template and sealed with a vacuum grease. Nitrogen at 0.069 MPa (10 psi) was kept on one side of the disk, whereas the other side was 0.069 MPa (10 psi) oxygen. The profile of oxygen concentration on the nitrogen side with time was monitored using the oxygen sensor on the nitrogen side. The time required for oxygen to permeate through the disk or for oxygen concentration on the nitrogen side to reach a constant value, was recorded and used to determine the oxygen permeability. Permeability was measured as oxygen transmission rate on a Mocon™ WX-TRAN 2/61 at 40° C. Where multiple samples were prepared using the same procedure, permeation rates are given for each sample.

In certain embodiments, a useful formulation for property evaluation would be as follows:

| Material I.D. | Parts |
| --- | --- |
| Elastomer/Clay | 100 + x parts of clay |
| Carbon black N660 | 60.0 |
| Stearic Acid | 1.0 |
| ZnO Kadox ™ 911 | 1.0 |
| MBTS | 1.0 |

Carbon black N660 can be obtained from, e.g., Cabot Corp. (Billerica, Mass.). Stearic acid, a cure agent, can be obtained from, e.g., C. K. Witco Corp.(Taft, La.), Kadox® 911, an activator, can be obtained from C. P. Hall (Chicago, Ill.). MBTS, 2-mercaptobenzothiazole disulfide, can be obtained from R. T. Vanderbilt (Norwalk, Conn.) or Elastochem (Chardon, Ohio).

As seen in the following examples, the use of star-branched rubbers in nanocomposites can improve the barrier properties over nanocomposites of straight-chain polymers. Star-branched and straight chain polymers having similar chemical structures and compositions can interact within the polymer or nanocomposite matrix differently than do linear polymers due to the distinguished topology, chain interactions, and entanglements over the linear counterpart. These interactions can sometimes unexpectedly affect the final properties of the nanocomposites, positively or negatively, and we have found that the use of star-branched elastomers in nanocomposites results in improved barrier properties.

EXAMPLES

In the following examples, the following formulations were used:

| Material I.D. | Parts |
| --- | --- |
| Elastomer/Clay | 100 + x parts of clay |
| Carbon black N660 | 60.0 |
| Stearic Acid | 1.0 |
| ZnO Kadox ™ 911 | 1.0 |
| MBTS | 1.0 |

Nanocomposites comprising the star branched bromobutyl rubbers of the present invention [Examples 1-8] were compared to nanocomposites comprising only linear bromobutyl rubbers [Comparative Examples 1-8]. The straight chain polymer used in the Comparative Examples was Bromobutyl 2222, a brominated isobutylene-isoprene copolymer commercially available from ExxonMobil. The star branched polymer used in the following examples was star-branched Bromobutyl 6222 available from ExxonMobil having similar viscosity and bromine content as Bromobutyl 2222.

The nanocomposites of Examples 1-8 and Comparative Examples 1-8 were made by mixing the components in three stages or passes through a mixer. In pass one, 1100 grams of the isobutyl rubber (star branched or straight chain) was added to a Midget Banbury® mixer at 100 rpm and 60° C. After one minute of mixing, the clay was added to the mixer and the clay-polymer mixture was mixed for five minutes. The resulting nanocomposite was then recovered from the mixer. In pass two, a portion of the nanocomposite formed in pass one was added to the mixer at 100 rpm and 60° C. After one minute of mixing, the carbon black was added, mixed for four minutes, and the mixture recovered. In pass three, a portion of the nanocomposite formed in pass two was added to the mixer at 40 rpm and 50° C. After 30 seconds, the curatives were added and allowed to mix for 3 minutes. The resulting composition was recovered, pressed into a pad, cured and the oxygen permeability measured as described above. The amounts of the specified components and permeation results are presented in Table 1 below.

TABLE 1

Comparison of star-branched and linear butyl rubber nanocomposites.

| Sample | Rubber Type | Clay Type | Clay Amount (grams) | Pass 2 Amt from Pass 1 (grams) | Pass 3 Amount from Pass 2 (grams) | Permeation Rate (mm · cc/ m² · day) |
|---|---|---|---|---|---|---|
| Ex 1 | Star | Cloisite ® 6A | 11 | 228.75 | 308 | 137 |
| CE 1 | Linear | Cloisite ® 6A | 11 | 228.75 | 308 | 132 |
| Ex 2 | Star | Cloisite ® 6A | 22 | 237.5 | 316 | 132 |
| CE 2 | Linear | Cloisite ® 6A | 22 | 237.5 | 316 | 128 |
| Ex 3 | Star | Cloisite ® 25A | 11 | 228.75 | 308 | 126 |
| CE 3 | Linear | Cloisite ® 25A | 11 | 228.75 | 308 | 136 |
| Ex 4 | Star | Cloisite ® 25A | 22 | 237.5 | 316 | 115 |
| CE 4 | Linear | Cloisite ® 25A | 22 | 237.5 | 316 | 130 |
| Ex 5 | Star | Cloisite ® 6A | 44 | 915 | 1232 | 137 |
| CE 5 | Linear | Cloisite ® 6A | 44 | 915 | 1232 | 133 |
| Ex 6 | Star | Cloisite ® 6A | 88 | 950 | 1264 | 127 |
| CE 6 | Linear | Cloisite ® 6A | 88 | 950 | 1264 | 138 |
| Ex 7 | Star | Cloisite ® 25A | 44 | 915 | 1232 | 124 |
| CE 7 | Linear | Cloisite ® 25A | 44 | 915 | 1232 | 135 |
| Ex 8 | Star | Cloisite ® 25A | 88 | 950 | 1264 | 115 |
| CE 8 | Linear | Cloisite ® 25A | 88 | 950 | 1264 | 126 |

The above examples illustrate that for nanocomposites having similar compositions, star-branched rubbers can decrease the permeability of the nanocomposite, improving the barrier properties of the composition.

Embodiments of the final nanocomposite of the present invention are useful as air barriers, such as in innerliners for motor vehicles. In particular, the nanocomposites are useful in innerliners and innertubes for articles such as truck tires, bus tires, passenger automobile tires, motorcycle tires, and the like.

While the present invention has been described and illustrated by reference to particular embodiments, those of ordinary skill in the art will appreciate that the invention lends itself to many different variations not illustrated herein. For these reasons, then, reference should be made solely to the appended claims for purposes of determining the true scope of the present invention.

All priority documents are herein fully incorporated by reference for all jurisdictions in which such incorporation is permitted. Further, all documents cited herein, including testing procedures, are herein fully incorporated by reference for all jurisdictions in which such incorporation is permitted.

We claim:

1. An elastomeric nanocomposite consisting of:
a halogenated star-branched elastomer consisting of isobutylene derived units, isoprene derived units, halogen, and a polydiene branching agent;
0.5 to 10 wt percent of an exfoliated clay at least partially dispersed in the halogenated star-branched elastomer, wherein the clay is exfoliated with a dimethyl, dehydrogenated tallow, 2-ethylhexyl quaternary ammonium;
a reinforcing filler;
a curative system;
and at least one of a dye, pigment, antioxidant, heat and light stabilizer, plasticizer, or mixtures thereof.

2. The nanocomposite of claim 1 wherein the elastomer is halogenated with bromine or chlorine.

3. The nanocomposite of claim 1 wherein the reinforcing filler is selected from the group consisting of calcium carbonate, mica, silica, silicates, talc, titanium dioxide, carbon black, or mixtures thereof.

4. The nanocomposite of claim 1 wherein the curative system is selected from the group consisting of organic peroxide, zinc oxide, zinc stearate, stearic acid, an accelerator, a vulcanizing agent, or mixtures thereof.

* * * * *